Figure 1:
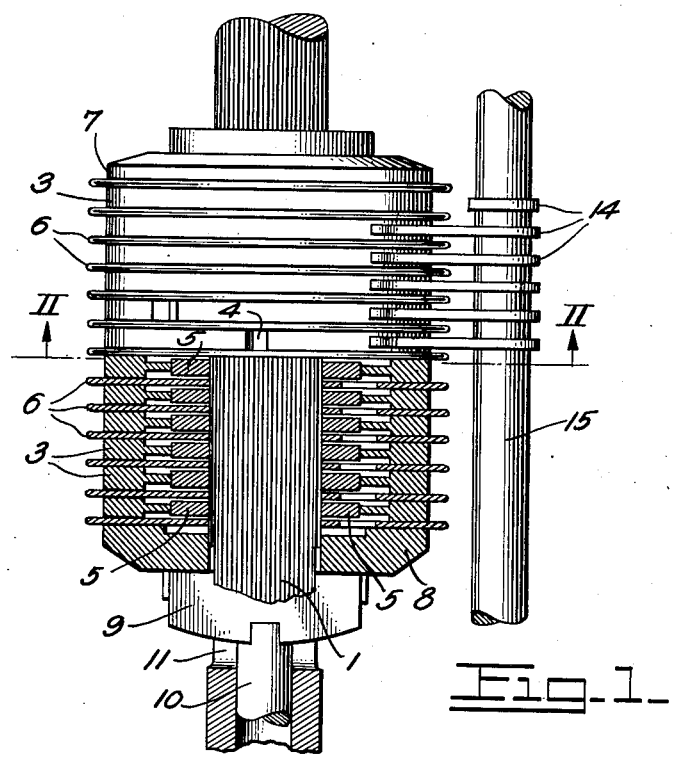

Nov. 4, 1952    W. L. VERVEST ET AL    2,616,300
SHAFT POSITIONING DEVICE
Filed Feb. 17, 1949

Inventor
WILHELMUS LAMBERTUS VERVEST
GOZEWIJN VAN GELDER

BY Fred M Vogel
AGENT.

Patented Nov. 4, 1952

2,616,300

UNITED STATES PATENT OFFICE 2,616,300

SHAFT POSITIONING DEVICE

Wilhelmus Lambertus Vervest and Gozewijn Van Gelder, Eindhoven, Netherlands, assignors to Hartford National Bank and Trust Company, Hartford, Conn., as trustee Application February 17, 1949, Serial No. 76,946
In the Netherlands March 3, 1948

8 Claims. (Cl. 74—10.2)

In apparatus one or more control-members of which require to be adjusted occasionally to some further position, use may be made of positioning devices which enable simple control and accurate adjustment of the control-members from a distance. If a control-member is adjusted by rotary movement of a shaft, as, for example, in rotary-electrode condensers of radio transmitting and receiving systems, it may be coupled with a positioning device comprising a shaft on which are seated a number of locking discs each of which one out of a system of pawls arranged at the side of the shaft is adapted to engage. The shaft, and hence also the control-member, are thus adapted to be locked in very definite positions. The position in which the shaft is locked upon engagement of a pawl with the edge of a locking disc—referred to hereinafter as a locking position—is determined by the relative position of the profile of the locking disc and the shaft on which this disc is seated. It is desirable that it should be possible for the locking positions of the shaft, that is to say the positions of the control-member coupled with the positioning device with the use of which said positions are required to be adjusted, to be fixed at will, accurately and independently of one another. For this purpose use is made of locking discs which are normally firmly held on the shaft but which are adapted to be disengaged and then turned relatively to the shaft each singly. By so rotating a locking disc and subsequently firmly re-seating it on the shaft a new locking position is obtained which is determined by the new relative positions of the profiled edge and the shaft.

It is well-known practice to seat the locking discs on the shaft, or a member firmly secured thereto, so as to be readily movable by arranging the locking discs, separated by friction discs which are not rotatable relative to the shaft, adjacent to each other and compressing the assembly in an axial direction. The locking discs are thus clamped between the friction discs and held by friction therewith. In order that the locking discs may be held tightly between the friction discs, the friction discs as a whole or, alternatively, for that part which is in contact with the locking discs, should be slightly displaceable in the direction of the shaft. On the one hand, satisfactory engagement of the discs when compressed is thus ensured and on the other hand it is achieved that upon removal of the compressing force each locking disc can be rotated relatively to the shaft without much difficulty.

In a known positioning device the locking discs and the friction discs are slipped over a sleeve firmly seated on the shaft. The inner edge of each friction disc is provided with a lug which is guided in a key track provided in the sleeve. The friction discs are consequently displaceable in the direction of the shaft but are not rotatable about this shaft. The locking discs, of which while the outer edge is profiled the inner edge is not, may be rotated at will about the shaft. The locking discs are secured in position relative to the shaft by clamping the system of locking discs and friction discs between a collar of the sleeve seated in the shaft and a nut adjustable in an axial direction.

In a further known construction the locking discs are constituted by rings supported upon intermediate discs slipped over the shaft. These intermediate discs are secured in position on the shaft together with the friction discs separating them with the use of a number of screws parallel to the shaft. The friction discs and the intermediate discs are jointly securely held between the heads of the screws and an upright shoulder of the shaft in which shoulder the apertures for the screws are provided. The locking rings are secured in position by clamping them with the use of screws which are also parallel to the shaft together with those parts of the friction discs that extend beyond the intermediate discs. The friction discs are resilient, so that the last-mentioned compression ensures satisfactory contact between the friction discs and locking rings.

Experience proved that the constructions described have a limitation in that the accurate determining of the positions in which the shaft is locked by engagement of the pawls and the associated locking discs presents difficulty and that the reproduceability of these locking positions leaves much to be desired. This difficulty is particularly prevalent if such positioning devices are used for tuning one or more control-members of radio transmitting or receiving systems which are required to be tuned to any of a small number of fixed frequencies. The inaccuracy in tuning due to inadequate harmony between the desired position and the locking position of the control-member necessitated to construct the system so that the errors in mechanical tuning are removed in the circuit-arrangement by electrical means. However, this solution makes the electrical part of the system complicated and thus results in an increase in price.

The invention has for its object to provide a construction of a positioning device comprising locking discs held in place by clamping together with friction discs, in which the said difficulties are obviated.

It is based on recognition of the fact that great precision in adjusting the shaft cannot be ensured unless any movement of the friction discs about the shaft is impossible, since otherwise it is impossible to rotate a locking disc or ring accurately into a definite position relative to the shaft without the adjacent locking discs being displaced, though slightly, through the adjacent friction discs. A change in adjustment of one locking disc thus counteracts the accuracy in adjustment of other locking discs. This is the case in the construction in which the friction discs are each provided with a lug which is guided in a key track in the shaft or in a member firmly secured to it. Since movement of the friction discs in an axial direction must remain possible, there is always a certain amount of play between the edge of the lug and the walls of the key way. Owing to this play the friction discs are slightly displaceable about the shaft and this involves the above-described detrimental effects. In the construction in which the friction discs are resilient and are urged, together with intermediate rings, against a shoulder with the use of screws, the length of the screws allows torsioning of the system formed by these discs. As a result, also in this construction, a change in adjustment of one locking ring affects the adjustment of the others. Moreover, the said torsioning may occur even when the locking rings are tightly held between the friction discs and this detracts from the reproduceability of the locking positions.

According to the invention each friction disc is flexible and separately secured in position on the shaft or a member firmly secured thereto. In this manner it is ensured that any rotation of the friction discs relative to the shaft is avoided, so that a change in adjustment of a locking disc or ring does not by any means affect the position occupied by the other locking discs or rings relative to the shaft. A change in adjustment also need not be feared, when, due to engagement of a pawl and the edge of a locking disc, whilst the latter is being held by frictional forces exerted by the adjacent friction discs, the rotation of the shaft is stopped. Consequently, the position in which the shaft is locked is invariably the same so long as the locking disc is held in place.

In a preferred embodiment of the positioning device according to the invention, at least that part of the shaft, or a member firmly secured thereto, which is embraced by the friction discs is provided with a number of sharp ribs extending substantially in the direction of the shaft and the friction discs engage both sides of these ribs. Rotary movement of the friction discs relative to the shaft is thus impossible.

In an alternative embodiment of the positioning device according to the invention the ribs have been forced into the inner edges of the friction discs, so that these edges follow the cross-profile of the part provided with ribs. This may be achieved by previously providing the friction discs with a central aperture, the diameter of which is smaller than the largest diameter of the part provided with ribs and by axially forcing the discs on that part. The ribs locally displace the material at the inner edge of the friction discs, so that subsequent rotation about the shaft is impossible.

Since the friction discs are secured to the shaft or a member secured thereto they are made so as to be flexible and this permits of the locking discs being held in place and released at will. The thickness and the material of the friction discs may be chosen so as to satisfy this condition at all times. According to the invention, each friction disc may comprise a recess which offers facility for elastic deformation owing to axial displacement of the parts co-operating with the locking discs.

Figure 2:
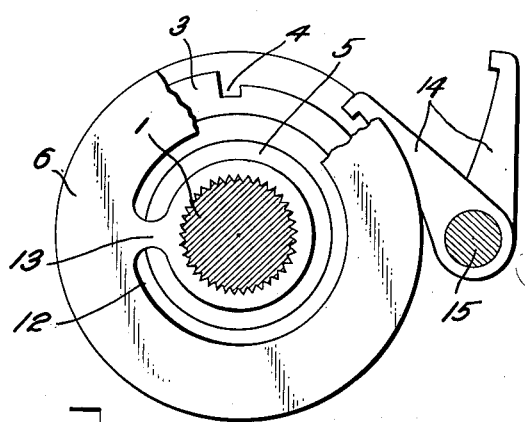

In order that the invention may be more clearly understood and readily carried into effect, it will now be described more fully with reference to the accompanying drawing, in which Fig. 1 shows diagrammatically, partly in side view, partly in longitudinal sectional view, one embodiment of a positioning device according to the invention, and Fig. 2 shows a cross-sectional view on the line II—II of Fig. 1.

Referring to the drawing, 1 designates a rotary shaft which is adapted to be locked in a number of positions with the use of movable pawls arranged at the side of the shaft. For this purpose, the shaft 1 has seated on it a number of locking rings 3, the periphery of which comprises a recess 4. The locking rings 3 are rotatable about and are supported by intermediate discs 5 seated on the shaft 1. The locking rings 3 have a narrow part which is directed towards the intermediate discs. The thickness of the intermediate discs is slightly smaller than the thickness of othe outer edge of the locking rings. Arranged on each side of each locking ring is a flexible friction disc 6. These discs are each separately secured tightly on the shaft 1 in a manner to be described hereinafter. The locking rings 3 are held in place relative to the shaft 1 by compressing the system formed by the locking rings and the friction discs. For this purpose, a thrust disc 7 seated on the shaft 1 is provided on one side of the system. The other side of the system is engaged by a thrust disc 8, which is displaceable in an axial direction. The said system is compressed between the thrust discs 7 and 8 by means of a plate 9 inserted through an aperture 11 in the shaft 1 and a thrust rod 10 housed in the shaft, with the result that the locking rings 3 are held in place by the friction effect of the adjacent friction discs 6. Removal of the compression results in each locking ring being separately rotatable. Change in position of the recess 4 in the edge of a locking ring relative to the shaft 1 is thus enabled.

The circumference of that part of the shaft 1 which is located between the thrust discs 7 and 8 comprises a number of longitudinal grooves, sharp ribs being thus produced on the surface. The inner edge of the friction discs 6 follows the cross-section of the shaft 1, so that any displacement of these discs relative to the shaft 1 is impossible. This is achieved during the component mounting of the pawl knob by previously providing each of the friction discs with a central aperture, the diameter of which is slightly smaller than the diameter of the shaft 1 including the height of the ribs. The friction discs are then forced in succession onto the shaft 1. The friction discs 6 furthermore comprise a C-shaped recess 12. A bridge-like junction 13 is left between the central part of the friction discs which embrace the shaft 1 and the outer part which is engaged by the locking rings 3. This has the advantage that the outer part of a friction disc is readily displaceable in an axial direction, an increase in flexibility resulting therefrom. It furthermore ensures that the displacement of material at the inner edge of the disc when forcing on to the shaft 1 does not result in warping. Since each friction disc 6 is seated separately on the shaft 1, rotation of the locking rings 3 relative to the shaft 1 is prevented upon compression of the system formed by the friction discs and the locking rings. Upon removal of the compression of the system each locking ring can be rotated without the least effect on the position taken up by the other relatively to the shaft 1.

Arranged alongside shaft 1 is a pawl shaft 15 upon which are rotatably mounted a plurality of pawls 14 each of which is adapted to be placed into position to engage one of the locking rings 3. On a pawl 14 being brought into engagement with the locking ring 3 arranged below it and the shaft being subsequently rotated, the latter is locked immediately, the recess 4 in the locking ring arrives under the end of the pawl and the latter snaps in. The position in which the shaft 1 is locked is determined by the position which the recess 4 occupies relatively to this shaft. So long as the locking rings remain clamped between the friction discs this position is invariable and this ensures that each time a given pawl is caused to become operative the shaft 1 is invariably locked accurately in the same position.

If the position in which the shaft is locked by a given pawl is required to be changed, the compression of the system formed by the friction discs 6 and the locking rings 3 is removed, whereupon each locking ring can be rotated about its intermediate disc 5 and accurately adjusted to the new desired position. In the meanwhile nothing has changed in the adjustment of the other locking rings, so that the positions in which the shaft, after renewed steadying of the locking rings, can be locked due to the other pawls being caused to become operative, have remained exactly unvaried.

What we claim is:

1. In a shaft positioning device, a rotatable shaft, a plurality of locking discs each being separately and rotatably supported by said rotatable shaft and each having an outer edge deformation thereon adapted to be engaged by one of a system of pawls to be arranged beside said shaft, a plurality of friction discs mounted on said rotatable shaft and each arranged alternately between said locking discs, means permanently fixing the inner peripheries of each of said friction discs against both rotative and axial displacement relative to said shaft, each of said friction discs having a flexible portion beyond the said inner peripheries thereof, respectively, whereby axial displacement of the outer peripheries of each of said friction discs is permitted.

2. In a shaft positioning device, a rotatable shaft, a plurality of locking discs each being separately and rotatably supported by said rotatable shaft and each having an outer edge deformation thereon adapted to be engaged by one of a system of pawls to be arranged beside said shaft, a plurality of friction discs mounted on said rotatable shaft and each arranged alternately between said locking discs, means permanently fixing the inner peripheries of each of said friction discs against both rotative and axial displacement relative to said shaft, said means comprising a plurality of sharp ribs mounted on said shaft and extending substantially longitudinally thereof and a plurality of projections on said inner peripheries of each of said friction discs extending between said ribs in press fit relationship therewith, each of said friction discs having a flexible portion beyond the said inner peripheries thereof, respectively, whereby axial displacement of the outer peripheries of each of said friction discs is permitted.

3. In a shaft positioning device, a rotatable shaft, a plurality of locking discs each being separately and rotatably supported by said rotatable shaft and each having an outer edge deformation thereon adapted to be engaged by one of a system of pawls to be arranged beside said shaft, a plurality of friction discs mounted on said rotatable shaft and each arranged alternately between said locking discs, means permanently fixing the inner peripheries of each of said friction discs against both rotative and axial displacement relative to said shaft, each of said friction discs having a flexible portion beyond the said inner peripheries thereof, respectively, said flexible portions having at least one cut-out portion to enhance the flexibility thereof, whereby axial displacement of the outer peripheries of each of said friction discs is permitted.

4. In a shaft positioning device, a rotatable shaft, a plurality of locking discs each being separately and rotatably supported by said rotatable shaft and each having a thickened outer edge which has a deformation thereon adapted to be engaged by one of a system of pawls to be arranged beside said shaft, each of said locking discs having a thinner inner region connected to the said thickened edge associated therewith, a plurality of friction discs mounted on said rotatable shaft and each arranged alternately between said locking discs, means permanently fixing the inner peripheries of each of said friction discs against both rotative and axial displacement relative to said shaft, each of said friction discs having a flexible portion beyond the said inner peripheries thereof, respectively, whereby axial displacement of the outer peripheries of each of said friction discs into engagement with said thickened edges of said locking discs is permitted.

5. In a shaft positioning device, a rotatable shaft, a plurality of intermediate discs, each of a predetermined thickness, mounted on said shaft, a plurality of locking discs each being separately and rotatably mounted on an associated one of said intermediate discs, each of said locking discs having a thickened outer edge which has a deformation thereon adapted to be engaged by one of a system of pawls to be arranged beside said shaft, the thickness of said thickened outer edges of each of said locking discs being greater than said predetermined thickness of said intermediate discs, a plurality of friction discs mounted on said rotatable shaft and each arranged alternately between said intermediate discs and said locking discs mounted thereon, means permanently fixing the inner peripheries of each of said friction discs against both rotative and axial displacement relative to said shaft, each of said friction discs having a flexible portion beyond the said inner peripheries thereof, respectively, whereby axial displacement of the outer peripheries of each of said friction discs into engagement with said thickened edges of said locking discs is permitted.

6. In a shaft positioning device, a rotatable shaft, a plurality of locking discs each being separately and rotatably supported by said rotatable shaft and each having an outer edge deformation thereon adapted to be engaged by one of a system of pawls to be arranged beside said shaft, a plurality of friction discs mounted on said rotatable shaft and each arranged alternately between said locking discs, means permanently fixing the inner peripheries of each of said friction discs against both rotative and axial displacement relative to said shaft, each of said friction discs having a flexible portion beyond the said inner peripheries thereof, respectively, and an outer peripheral portion mounted on each of said flexible portions, whereby axial displacement of the outer peripheries of each of said friction discs is permitted, the extreme edge portion of said outer peripheral portions extending beyond the outer edges of adjacent locking discs, whereby pawl guiding channels are provided.

7. In a shaft positioning device, a rotatable shaft, a plurality of locking discs each being separately and rotatably supported by said rotatable shaft and each having an outer edge deformation thereon adapted to be engaged by one of a system of pawls to be arranged beside said shaft, a plurality of friction discs mounted on said rotatable shaft and each arranged alternately between said locking discs, means permanently fixing the inner peripheries of each of said friction discs against both rotative and axial displacement relative to said shaft, each of said friction discs having a flexible portion beyond the said inner peripheries thereof, respectively, an outer peripheral portion mounted on each of said flexible portions, and thrust disc means for causing axial displacement of the outer peripheries of each of said friction discs into engagement with said outer edge of an adjacent locking disc.

8. In a shaft positioning device, a rotatable shaft, a plurality of intermediate discs, each of a predetermined thickness, mounted on said shaft, a plurality of locking discs each being separately and rotatably mounted on an associated one of said intermediate discs, each of said locking discs having a thickened outer edge which has a deformation thereon adapted to be engaged by one of a system of pawls to be arranged beside said shaft, the thickness of said thickened outer edges of each of said locking discs being greater than said predetermined thickness of said intermediate discs, a plurality of friction discs mounted on said rotatable shaft and each arranged alternately between said intermediate discs and said locking discs mounted thereon, means permanently fixing the inner peripheries of each of said friction discs against both rotative and axial displacement relative to said shaft, each of said friction discs having a flexible portion beyond the said inner peripheries thereof, respectively, and an outer peripheral portion mounted on each of said flexible portions, and thrust disc means for causing axial displacement of the outer peripheries of each of said friction discs into engagement with said outer edge of an adjacent locking disc.

WILHELMUS LAMBERTUS VERVEST.
GOZEWIJN VAN GELDER.

REFERENCES CITED

The following references are of record in the file of this patent:

UNITED STATES PATENTS

| Number | Name | Date |
|---|---|---|
| 2,334,724 | Paessler | Nov. 23, 1943 |
| 2,378,941 | May | June 26, 1945 |
| 2,472,979 | May | June 14, 1949 |
| 2,493,622 | Eskuchen | Jan. 3, 1950 |